(12) United States Patent
Habusha et al.

(10) Patent No.: US 10,489,302 B1
(45) Date of Patent: *Nov. 26, 2019

(54) EMULATED TRANSLATION UNIT USING A MANAGEMENT PROCESSOR

(71) Applicant: Amazon Technologies, Inc., Seattle, WA (US)

(72) Inventors: Adi Habusha, Moshav Alonei Abba (IL); Leah Shalev, Zichron Yaakov (IL); Nafea Bshara, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/965,697

(22) Filed: Apr. 27, 2018

Related U.S. Application Data

(63) Continuation of application No. 14/982,977, filed on Dec. 29, 2015, now Pat. No. 9,959,214.

(51) Int. Cl.
*G06F 12/1009* (2016.01)
*G06F 12/0802* (2016.01)
*G06F 3/06* (2006.01)
*G06F 9/455* (2018.01)

(52) U.S. Cl.
CPC ........ *G06F 12/1009* (2013.01); *G06F 3/0604* (2013.01); *G06F 3/0638* (2013.01); *G06F 3/0673* (2013.01); *G06F 9/45558* (2013.01); *G06F 12/0802* (2013.01); *G06F 2009/45583* (2013.01); *G06F 2212/50* (2013.01); *G06F 2212/60* (2013.01)

(58) Field of Classification Search
CPC .......................... G06F 12/1009; G06F 12/1027
See application file for complete search history.

(56) References Cited

U.S. PATENT DOCUMENTS

| 9,959,214 B1 | 5/2018 | Habusha et al. |
| 2005/0160229 A1* | 7/2005 | Johns .................. G06F 12/1027 |
| | | 711/137 |
| 2011/0202724 A1 | 8/2011 | Kegel et al. |
| 2013/0080714 A1 | 3/2013 | Kegel et al. |

(Continued)

OTHER PUBLICATIONS

Mijat, Roberto, Virtualization is Coming to a Platform near you, Arm White Paper (Year: 2011).*

(Continued)

*Primary Examiner* — Ryan Bertram
*Assistant Examiner* — Edmund H Kwong
(74) *Attorney, Agent, or Firm* — Kilpatrick Townsend & Stockton LLP

(57) ABSTRACT

An emulated input/output memory management unit (IOMMU) includes a management processor to perform page table translation in software. The emulated IOMMU can also include a hardware input/output translation lookaside buffer (IOTLB) to store translations between virtual addresses and physical memory addresses. When a translation from a virtual address to a physical address is not found in the IOTLB for an I/O request, the translation can be generated by the management processor using page tables from a memory and can be stored in the IOTLB. Some embodiments can be used to emulate interrupt translation service for message based interrupts for an interrupt controller.

20 Claims, 11 Drawing Sheets

(56) References Cited

U.S. PATENT DOCUMENTS

| | | | |
|---|---|---|---|
| 2014/0068137 A1* | 3/2014 | Kegel | G06F 12/1009 711/6 |
| 2014/0379956 A1 | 12/2014 | Chang et al. | |
| 2016/0283384 A1 | 9/2016 | Podaima et al. | |

OTHER PUBLICATIONS

U.S. Appl. No. 14/982,977, "Final Office Action", dated Sep. 15, 2017, 10 pages.
U.S. Appl. No. 14/982,977, "Non-Final Office Action", dated Mar. 7, 2017, 10 pages.
U.S. Appl. No. 14/982,977, "Notice of Allowance", dated Jan. 10, 2018, 9 pages.
Deacon, "Linux Cross Reference: Free Electrons", ARM Retrieved from the Internet: <URL: http://lxr.freeelectrons.com/source/drivers/iommu/arm-smmu.c>, 2013, 20 pages.
Mijat et al., "Virtualization is Coming to a Platform Near You", The ARM® Architecture Virtualization Extensions and the Importance of System MMU for Virtualized Solutions and Beyond. Whitepaper Retrieved from the Internet: <URL: https://www.arm.com/files/pdf/System-MMU-Whitepaper-v8.0.pdf>2010, 12 pages.

\* cited by examiner

EMULATED TRANSLATION UNIT USING A MANAGEMENT PROCESSOR

CROSS REFERENCE TO RELATED APPLICATIONS

This Application is a continuation of and claims priority to U.S. application Ser. No. 14/982,977, filed Dec. 29, 2015, issued as U.S. Pat. No. 9,959,214 on May 1, 2018, and titled "EMULATED TRANSLATION UNIT USING A MANAGEMENT PROCESSOR," the contents of which are herein incorporated in its entirety.

BACKGROUND

In a computer system, a memory management unit (MMU) is generally used to translate central processing unit (CPU)-visible virtual addresses to physical addresses. In some instances, an Input/output memory management unit (IOMMU) is used to translate device-visible virtual addresses to physical addresses for direct memory access (DMA) capable devices. An IOMMU generally includes a page table translator that implements specific translation architecture in hardware for translations from virtual addresses to physical addresses, e.g., ARM® SMMU v1/v2, Intel® IOMMU v1/v2, AMD® I/O virtualization technology v1/v2. In most cases, the implemented architecture matches the CPU MMU architecture implemented on the same silicon.

Generally, IOMMU implementations are tightly coupled to the CPU MMU architecture. Therefore, in most instances, as different architectures evolve (e.g., new versions, change from 32-bit to 64-bit, etc.), IOMMU implementations need to be updated to keep up with the evolving MMU architecture.

BRIEF DESCRIPTION OF THE DRAWINGS

Various embodiments in accordance with the present disclosure will be described with reference to the drawings, in which.

DETAILED DESCRIPTION

Figure 1:
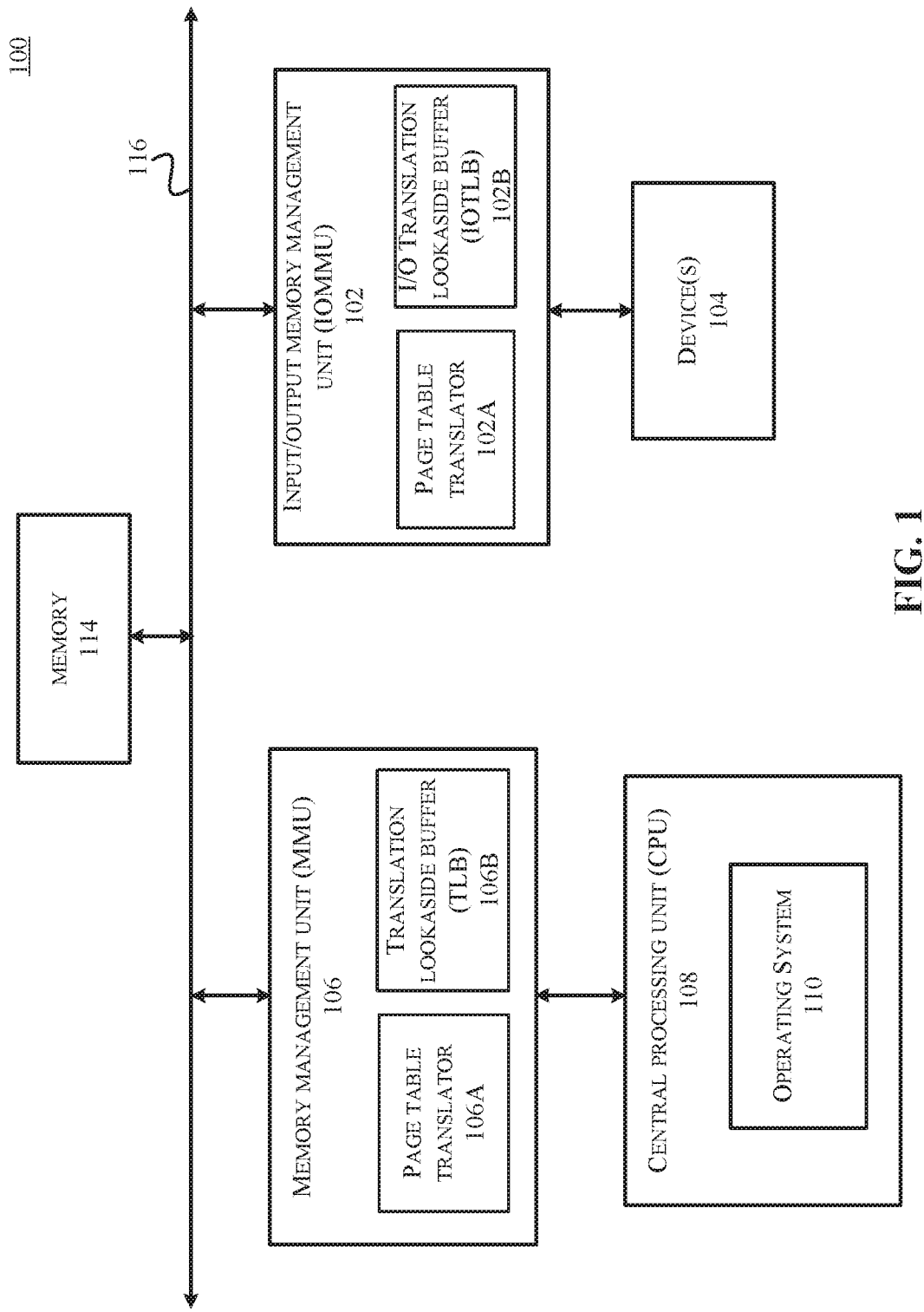
FIG. 1 illustrates a system comprising an input/output memory management unit (IOMMU) and a memory management unit (MMU).

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Virtualization can allow emulation of a single device to be used as multiple virtual devices. A hypervisor or a virtual machine manager (VMM) can emulate a single device as multiple virtual devices in the virtualized environment. A virtual machine may be any suitable emulation of a computer system that may be managed by the hypervisor. The hypervisor can also manage the flow of information between software, the virtualized hardware, and the physical hardware. In some instances, virtualization can allow multiple virtual machines to run on the same hardware device in their respective guest operating systems. Para-virtualization can allow communication between the guest operating systems and the hypervisor that can result in improved performance since the guest operating systems can run in cooperation with the hypervisor. The hypervisor can support virtualization of I/O requests from virtual machines executing from their respective guest operating systems. It is desirable to isolate and contain device accesses to only those resources that are assigned to the device by the hypervisor.

Generally, all the devices that are capable of direct memory access generate addresses in the physical address space. In a system, where each guest operating system is running inside a virtual machine, the memory that is being allocated by the guest operating system is not the true physical memory of the system, but instead it is an intermediate physical memory. In a virtualized environment, these physical addresses can be intermediate physical addresses (e.g., guest operating system addresses) and may require further translation, e.g., from the intermediate physical address to a physical memory address.

An IOMMU is a memory management unit that can connect a DMA capable I/O bus to a main memory in a computer system. In most instances, an IOMMU is implemented as part of a system-on-chip (SoC). Like a traditional MMU which translates CPU-visible virtual addresses to physical addresses, the IOMMU maps device-visible virtual addresses (also called device addresses or I/O addresses in this context) to physical addresses. Generally, an IOMMU implementation includes a page table translator which implements a specific translation architecture and a translation lookaside buffer (TLB) to cache the most commonly used translations. The IOMMU can generally be managed using a programming interface e.g., through register access or in-memory queue. For example, the programming interface can allow IOMMU initialization, invalidation of specific contexts or TLB entries.

In virtualized environments, virtual machines are clients that use the DMA devices and program the DMA address from their context view (e.g., guest operating system address). At any instance, a number of virtual machines may be active, e.g., a number of DMA threads may be running simultaneously. DMA-mapping functionality can translate the address of the incoming DMA request to the correct physical memory address and can perform permission checks to access that physical address, based on the information provided by the hypervisor. To perform the DMA mapping, the hypervisor can execute an IOMMU driver to communicate with the IOMMU hardware. Generally, the IOMMU driver is architecture and chip implementation specific. For example, the IOMMU driver can vary for different architectures, e.g., x86, ARM, 32-bit or 64-bit, etc.

In most instances, the IOMMU hardware implementation for a specific SoC is dependent on the translation architecture, hardware resources, use cases and various software layers. For example, the IOMMU hardware implementation may depend upon a number of factors, e.g., number of virtual CPUs supported by the system architecture, number of DMA threads running simultaneously, capacity and distribution of the physical memory, and whether a single stage or two-stage translation may be required to translate from a guest operating system virtual address to a physical memory address. The IOMMU architecture is tightly coupled to the MMU architecture. Thus, as the MMU architecture evolves, the IOMMU hardware implementation may need to be updated to match with the MMU architecture generally implemented on the same silicon, requiring additional time and resources.

Embodiments of the disclosed technologies can emulate page table translation in software to provide translations from a virtual space to a physical space. A translation cache can be implemented in hardware using a generic structure to store commonly used translations. In some embodiments, the page table translator can generate architecture specific translations from a virtual address to a physical address in software. In some embodiments, a management processor can execute firmware for implementing the emulated page table translator functionality. When a memory access is requested by a device using a virtual address, the translation cache is searched for a corresponding physical address. If the translation for the virtual address does not reside in the translation cache (e.g., TLB miss), the translation request is sent to the management processor via a memory mapped interface. The management processor can generate the translation using page tables in a memory and can store the translation in the translation cache.

In a virtualized environment, multiple DMA threads may be running simultaneously by various virtual machines executing their respective guest operating systems. An IOMMU driver may be executed from the hypervisor to perform the DMA mapping for a specific context translation setting. In different embodiments, the management processor can translate a legacy IOMMU driver, which is specific to an architecture or implementation, to an application programming interface (API) for specific implementations of the translation cache. The IOMMU driver can configure the page tables in the memory per architecture and implementation. For example, different page tables may be implemented for x86, ARM, 32-bit or 64-bit architectures. The IOMMU driver can also execute memory mapped input/output (MMIO) transactions to configure the IOMMU hardware. The MMIO transactions can be buffered in a MMIO transaction buffer (e.g., a FIFO) in the memory. The MMIO transaction buffer can generate a trap to the management processor to emulate the IOMMU driver request. The management processor can process the transaction by emulating the translation in software. The management processor can also service functions for invalidation, exception handling, etc. in addition to providing address translations. In some embodiments, the management processor can also perform address translation for devices that execute their own memory space and need to be translated to the system memory space, e.g., a graphics processor unit (GPU) or another execution unit. Emulating the page table translation in software can provide flexibility and can minimize changes to IOMMU hardware for different architectures and implementations of the SoC.

Embodiments of the disclosed technologies can be used in systems that implement architecture specific translations in hardware using memory based accesses, and caches. For example, embodiments of the disclosed technologies can also be used to emulate an interrupt translation service (ITS) for interrupt controllers. The translation results can be cached in an interrupt translation cache before passing to an interrupt distribution logic. By emulating the ITS, some embodiments can provide a flexible solution to different versions of the interrupt controllers and robustness to system topology (e.g., number of virtual machines, number of interrupts) on the same silicon. Further, some embodiments can be used to service functions for interrupt remapping, invalidation and exception handling associated with interrupt translation.

FIG. 1 illustrates a system comprising an IOMMU and an MMU. Like a traditional MMU that provides address translations for memory accesses by a central processing unit (CPU), the IOMMU provides address translations for memory accesses by various devices. For example, a device can issue a request to access a memory location in a memory, e.g., a memory read or write request. In some instances, the memory request may be part of a direct memory access (DMA) read or write operation. For example, DMA operations may be performed to transfer data between the memory and various devices with minimum CPU overhead. The IOMMU can provide isolation between devices thus enhancing system reliability. The IOMMU can also provide memory protection by avoiding DMA attacks and can enable secure memory accesses.

As illustrated in the figure, a system 100 may include an IOMMU 102 communicatively coupled to a memory 114 via a system bus 116. The IOMMU 102 may be configured to provide memory management for one or more devices 104, e.g., peripheral devices, I/O devices, etc. Some non-limiting examples of the devices 104 may include network interface controllers, graphics controllers, audio cards, video accelerators, disc drive controllers, storage devices, etc. In some instances, the one or more devices 104 may be DMA capable devices. For example, the DMA read or write operations may be performed between the DMA capable devices and the memory 114 with minimum interaction with a CPU 108. The memory 114 may be a volatile memory. For example, the memory 114 may include a random access memory such as a DRAM, synchronous DRAM, double data rate (DDR) SDRAM, etc. The CPU 108 may be coupled to the memory 114 via a memory management unit (MMU) 106. An operating system 110 may provide a software platform for running various application programs or processes on top of the operating system 110.

The CPU 108 may include a plurality of processing cores. In some instances, the CPU 108 architecture may be based on x86 (e.g., Xeon, Pentium, etc.), ARM®, PowerPC, or any suitable architecture. The operating system 110 can support virtual memory management to partition the physical memory controlled by the operating system 110 across multiple processes. For example, in a virtualized environment, each process' memory may be dispersed across different parts of the physical memory (e.g., the memory 114) or may reside in an external memory (e.g., a hard disk).

The MMU 106 can perform translation of virtual memory addresses to physical memory addresses for accesses to the memory 114 by different processes. The MMU 106 can include a page table translator 106A and a TLB 106B. The page table translator 106A can store the mapping of virtual memory addresses to the physical memory addresses in page tables. The page tables may be implemented using any suitable data structure. For example, hierarchical or multi-level page tables may be implemented that can be accessed using pointers, indices, offsets, etc. The TLB 106B generally caches recently used mappings from the page table translator 106A. In some implementations, the TLB 106B can be an associative cache. When a memory access is requested, the TLB 106B is searched for a mapping. If a match is found (a TLB hit), a corresponding physical memory address is provided by the TLB 106B. If the mapping does not exist in the TLB 106B (a TLB miss), a page table walk may be performed in the page tables 106A to provide the mapping. The TLB 106B may be updated to include the mapping from the page tables 106A. In some instances, the page table walk may fail, for example, if the virtual memory address provided for the translation is invalid or the requested page is not resident in the memory 114 (e.g., have been moved out to an external memory).

Similar to the MMU 106, the IOMMU 102 can include a page table translator 102A and an input/output translation lookaside buffer (IOTLB) 102B. The page table translator 102A may include page tables comprising the mapping between the virtual memory addresses and the physical memory addresses. For example, the virtual memory addresses may be provided by the device 104 for a read or write access to the memory 114 for DMA operations. In some instances, the virtual memory addresses may include device addresses or I/O addresses. The IOTLB 102B may be similar to the TLB 106B and can be implemented as a cache. For example, the IOTLB 102B can cache recently used mappings from the page tables implemented by the page table translator 102A. The IOMMU 102 can intercept the access by the device 104 and can translate the virtual memory address to the physical memory address that can be used to access the memory 114. The IOMMU 102 can allow address translation for the device addresses to address full physical memory address range.

Figure 2:
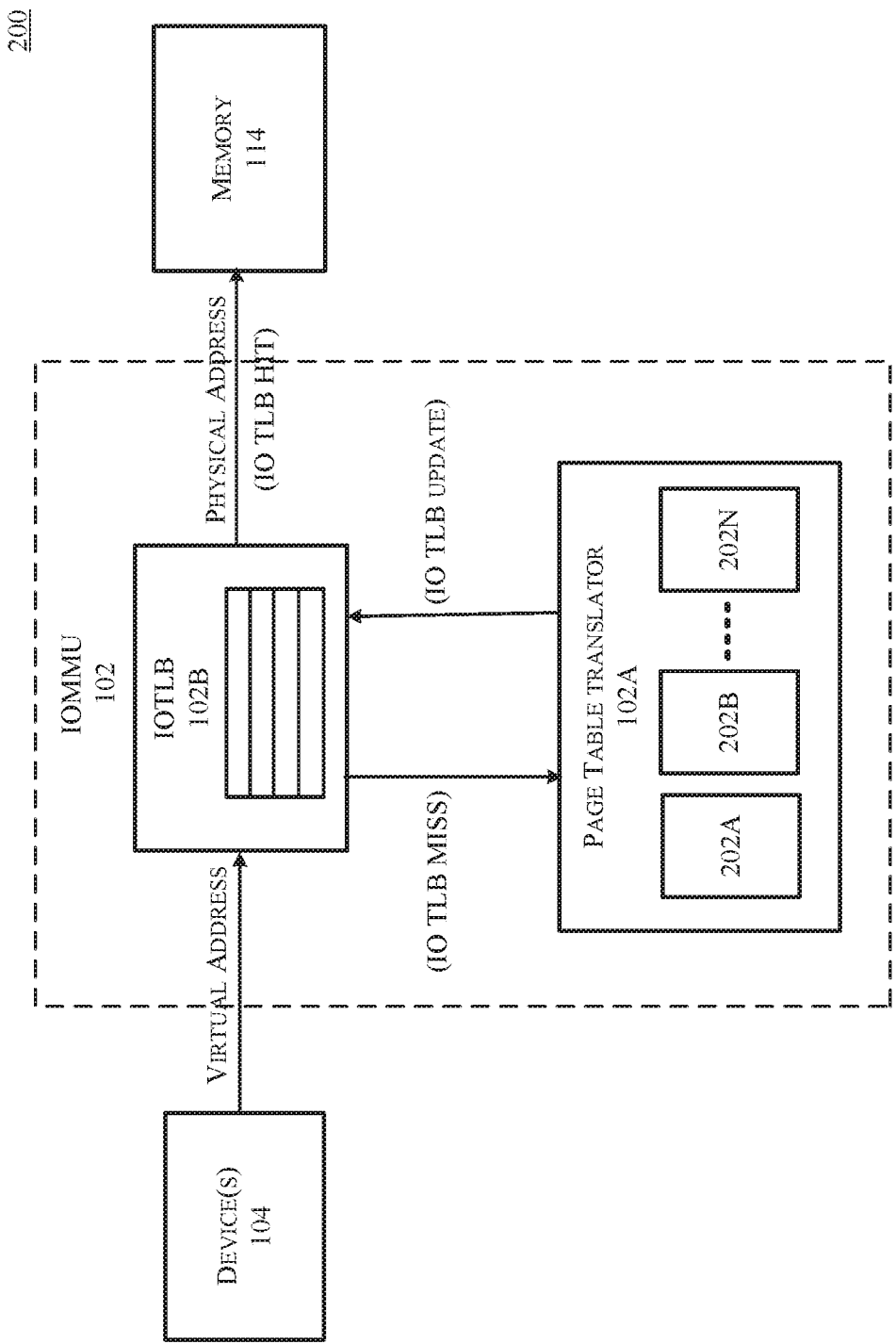
FIG. 2 illustrates a high level diagram of the mapping performed by the IOMMU.

In most instances, the page table translator 102A may implement a specific translation architecture which matches the MMU architecture. For example, a page table hierarchy implemented in the page table translator 102A may follow the MMU 106 hierarchy. In some instances, the MMU 106 and the IOMMU 102 may be implemented on the same silicon, e.g., as part of a SoC. Thus, as the MMU 106 implementation changes to support different architectures, versions, etc., IOMMU 102 implementation may need to be updated. Mapping performed by the IOMMU 102 is further explained with reference to FIG. 2.

The page table translator 102A may include a plurality of page tables 202A, 202B and 202N. For example, the page tables 202A-202N may provide the mappings between the virtual memory addresses and the physical memory addresses. It will be understood that the page tables 202A-202N may be implemented using any suitable data structure, e.g., pointers, indices, multiple levels or hierarchies, offsets, etc.

When a memory access is requested by the device 104, the IOTLB 102B is searched for a match. If a match is found (an IOTLB hit), a corresponding physical memory address is provided by the IOTLB 102B. If there is no match in the IOTLB 102B (an IOTLB miss), a page table walk may be performed by the page table translator 102A to look for a match in the page tables 202A-202N. If a match is found in the page tables 202A-202N, the IOTLB 102B may be updated to include the mapping and the corresponding physical memory address may be provided by the IOTLB 102B.

Generally, the IOMMU 102 implementation follows the CPU 108 architecture. In some instances, the translation architecture implemented by the IOMMU 102 hardware matches the CPU 108 architecture on the same silicon. For example, for different CPU MMU architectures (X86, ARMv8, etc.), the IOMMU 102 implementation may be based on the corresponding architecture, e.g., Intel IOMMUv1/2, AMD, AMD I/O Virtualization Technology v1/2, ARM SMMU and Virtualization extension v1/v2, etc. Software architecture for an IOMMU is further explained with reference to FIG. 3.

In a virtualized environment, virtual machines are clients that can use the DMA capable devices. At any instance, a number of virtual machines may be active, e.g., executing various DMA operations. For example, a virtual machine 306A may use a first device (e.g., a network interface card) to perform a first DMA operation to store packets from a network to the memory, and an Nth virtual machine 306N may perform a second DMA operation to copy data from the memory to a second device (e.g., a hard disk). The number of virtual machines that can run simultaneously may depend on the CPU architecture. In some instances, number of contexts can be same as the number of virtual machines that can be supported by the system architecture. Thus, a number of contexts may be running simultaneously. The hypervisor may be configured to perform a context switch among the virtual machines. The IOMMU can aid memory management by supporting multiple translation contexts for multiple DMA capable masters. However, the number of DMAs that can be performed simultaneously by different virtual machines may be limited by the IOMMU hardware design. For example, the page table translator 102A, as discussed with reference to FIG. 1, may be limited by its hardware implementation to support only a certain number of contexts.

Figure 3:
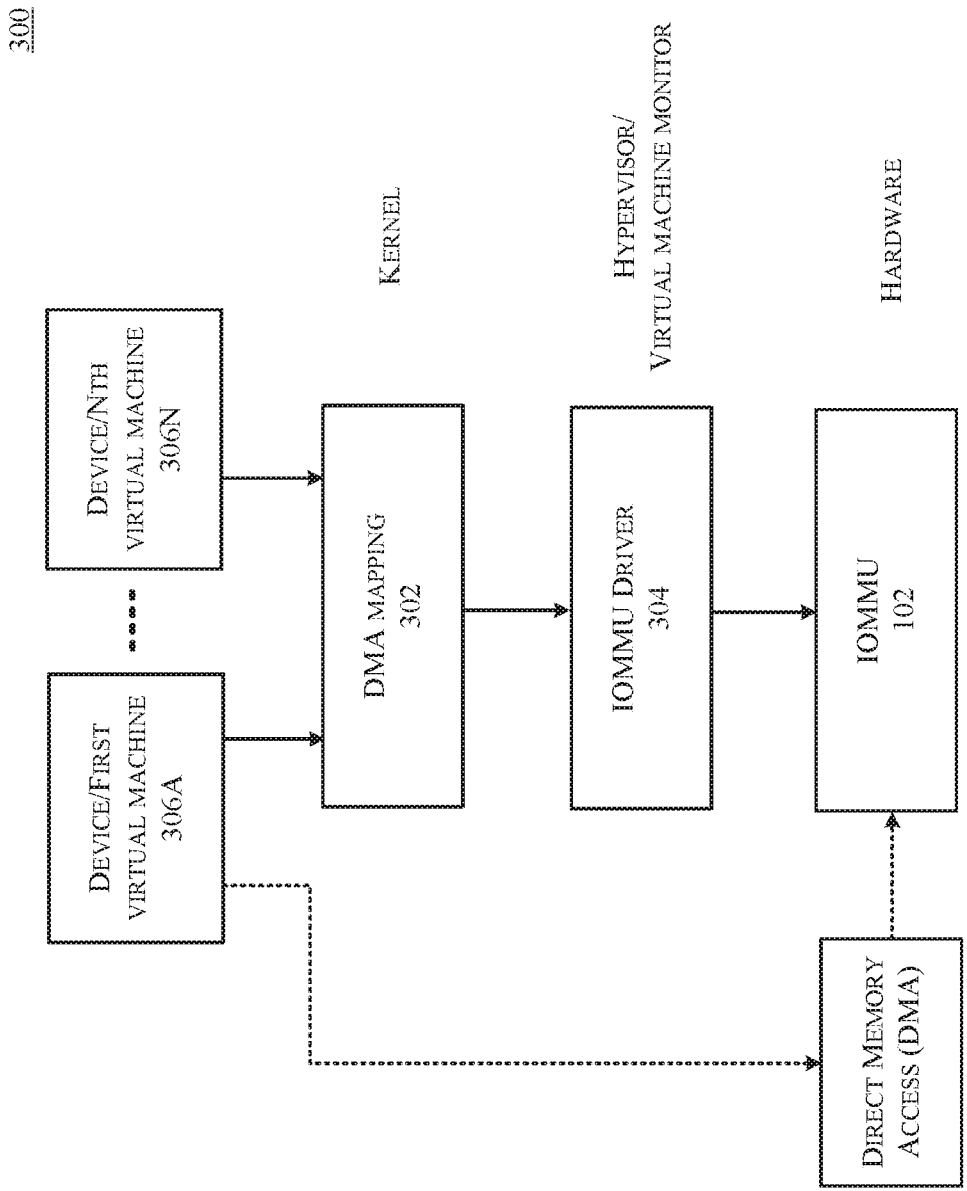
FIG. 3 illustrates software architecture for an IOMMU in a virtualized environment.

Generally, the virtual machines can program the DMA address from their context view, e.g., the guest operating system address. As illustrated in FIG. 3, the first virtual machine 306A or the $N^{th}$ virtual machine 306N can perform DMA operations with the one or more devices 104. DMA mapping may be performed to translate the DMA address programmed by the virtual machine to a corresponding physical memory address. When requesting for the DMA mapping (e.g., via a kernel), a hypervisor can be called to run an IOMMU driver 304 for the specific translation setting. For example, the hypervisor may be executing on the operating system 110 as discussed with reference to FIG. 1. Each virtual machine can have a view of physical address space that may be different than the true physical address space. Depending on the software usage model, the DMA address space may be a guest physical address space of the virtual machine to which the device is assigned, an application virtual address space assigned to an application, or some abstract I/O virtual address space defined by the software. Thus, a single stage or two-stage translation may be performed to translate to its corresponding physical memory address. For example, a single stage translation may need to be performed to translate from a guest physical address associated with a guest operating system executing from a virtual machine to a physical memory address. A two stage translation may need to be performed to translate from a virtual address to an intermediate physical address and from the intermediate physical address to the physical memory address.

The IOMMU driver 304 may include software code for communicating with the IOMMU 102. For example, the IOMMU driver 304 may provide an interface for communication between various guest operating systems running in their respective virtual machines and the IOMMU 102 hardware. Generally, the IOMMU driver 304 is architecture and chip implementation specific. The IOMMU driver 304 can provide various configuration, control and management interface to the underline hardware for the IOMMU 102. For example, the IOMMU driver 304 can build page formats (e.g., x86, ARM, etc.) in the memory 114 for page table walks, can initialize the IOMMU 102 with the transaction contexts for active virtual machines, and can manage context switches, e.g., IOTLB invalidation, re-initialization, etc.

Generally, the IOMMU architecture is tightly coupled to the processor MMU architecture. Further, the IOMMU implementation is specific to the SoC comprising the IOMMU. For example, the IOMMU implementation may depend on the number of virtual CPUs supported by the architecture, number of DMA threads that are running simultaneously, capacity and distribution of the physical memory, whether the DMA is running on a guest operating system physical address (single translation stage is required to translate to a physical address) or a guest operating system intermediate physical address (two stage translations is required), etc. Hence, the IOMMU implementation for a specific SoC can have many dependencies on the translation architecture, hardware resources, use-cases and software layers. For example, in some instances the hypervisor can map the physical memory to the virtual machines in a way that can result in huge-page or very fragmented memory. It is also desirable to have a generic IOMMU architecture that can support different operating systems (e.g., Linux®, Windows®, etc.) and hypervisor (e.g., Xen, KVM, etc.) implementations. Additionally, implementation of the page table translator in hardware can be complex based on the implemented CPU architecture, thus adding to the silicon area and power dissipation of the SoC.

Figure 4:
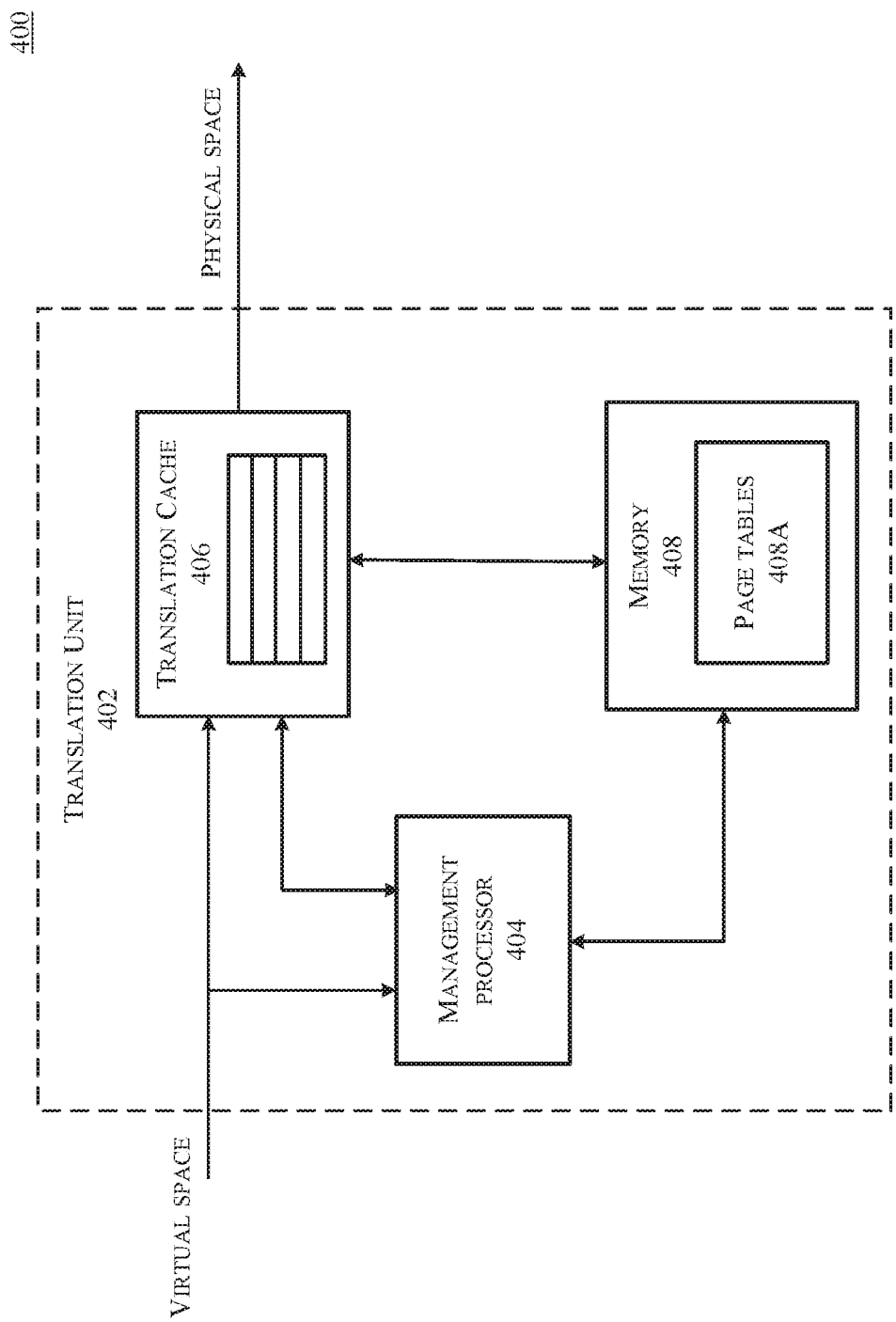
FIG. 4 illustrates a translation unit configured to perform translations from a virtual space to a physical space in software, according to some embodiments of the disclosed technologies.

FIG. 4 illustrates a translation unit configured to perform translations from a virtual space to a physical space in software, according to some embodiments of the disclosed technologies. A translation unit 402 includes a management processor 404 communicatively coupled to a translation cache 406 and to a memory 408. The translation unit can provide page table translation in software for memory mapped requests. The translations can be cached in a hardware translation cache to provide faster results as compared to performing page walks in the memory. The translation unit 402 can be implemented as a circuit, e.g., SoC, field programmable gate array (FPGA), microprocessor or application specific integrated circuit (ASIC).

The memory 408 may include a plurality of page tables 408A for generating translations between the virtual space and the physical space. The page tables 408A may be implemented in the memory 408 using any suitable data structure, e.g., pointers, indices, trees or hierarchies. For example, in one implementation, the page tables 408A may include a multi-level tree of 4K tables indexed by a set of virtual address bits. Each page table entry can be a page directory entry with a pointer for a lower level page table. In some embodiments, the page tables 408A may be implemented using a format compatible with the architecture and implementation of the SoC. The memory 408 may include volatile memory. For example, the memory 408 may include a random access memory such as a DRAM, synchronous DRAM, double data rate (DDR) SDRAM, etc.

In some embodiments, the translation cache 406 may be implemented in hardware using any suitable implementation, e.g., set associative, direct mapped RAM, fully associative, content addressable memory (CAM), etc. The translation cache 406 may store a set of translations between the virtual space and the physical space. For example, the translation cache 406 may store commonly used translations between the virtual space and the physical space. Contents of the translation cache 406 may be managed by the management processor 404. In some embodiments, the management processor 404 may be configured to manage invalidation, context switching and exception handling (e.g., translation faults, aborts) associated with the translation. The translation cache 406 may be similar to the IOTLB 102B as discussed with reference to FIG. 2. In some embodiments, the translation cache 406 may include translation tables that are part of the memory 408. For example, the translation tables may store translations between the virtual space and the physical space that are generated by the management processor 404. In some embodiments, the translation cache 406 may be implemented in hardware and the translation tables may be implemented in the memory 408 as a secondary cache. For example, the translation cache 406 may store a first set of translations in hardware and the translation tables may store a second set of translations in the memory 408. The second set may be larger than the first set.

The management processor 404 can include a processing core configured to execute firmware stored in a computer readable storage medium, e.g., RAM, ROM, Electrically Erasable Programmable Read-Only Memory (EEPROM), flash memory or any suitable computer readable storage media. When a request is received for a translation from the virtual space to the physical space, the translation cache 406 is looked for a match. For example, the translation request may be generated by writing to a memory mapped register. If the translation does not reside in the translation cache 406, the management processor 404 may receive the request for the translation. The management processor 404 may generate the translation using the plurality of page tables 408A from the memory 408 for storing in the translation cache 406. The management processor 404 may generate the translation in a format suitable for storing in the translation cache 406. For example, in some embodiments, the translated address may include the physical memory address concatenated with few bits of the virtual address. The management processor 404 may also be configured to manage contents of the translation cache 406, e.g., maintain cache coherency and service instructions for invalidation, context switching, etc. For example, in some embodiments, context switching may be performed to switch contexts for various virtual machines or processes, between different address spaces, for initialization of the translation cache 406 or for pre-loading of the translation cache 406 with specific values. In some instances, the translation cache 406 may need to be flushed or some or all the entries may need to be invalidated based on which virtual machines are active. For example, the management processor 404 may perform invalidation on a context switch or as part of a cache coherency protocol, e.g., for data consistency of a shared cache entry across the system. In some embodiments, the management processor 404 may change the value of a flag or a variable associated with an entry to invalidate the cache entry. For example, the management processor 404 may change the flag associated with an entry to a first value (e.g., zero) for an inactive virtual machine and to a second value (e.g., one) for an active virtual machine. Each virtual machine can be identified by its corresponding virtual machine identifier. In some embodiments, the management processor 404 may perform permission checking to determine if the access to the device is permitted before generating the translation. In some instances, the translation process may result in a translation fault or an exception, e.g., a page fault due to invalid entry, page not present, permission errors, memory access error, etc. The management processor 404 may execute operations for exception handling by reporting the translation fault or any other exception back to the hypervisor. In some instances, the management processor 404 may abort the translation in case of an exception. The management processor 404 may store the translation for the request in the translation cache 406 if the translation was successful.

In one embodiment, the translation unit 402 may be used to emulate the IOMMU functionality. For example, the translation unit 402 may be used to translate an address from the virtual space (e.g., a device virtual address, a guest operating system virtual physical address) to an address from the physical space (e.g., a physical memory address). In another embodiment, the translation unit 402 may be used to emulate an interrupt translation service (ITS) for an interrupt controller. For example, the translation unit 402 may be used to translate an interrupt identifier from the virtual space for a message based interrupt to an address from the physical space for distributing the interrupt.

Figure 5:
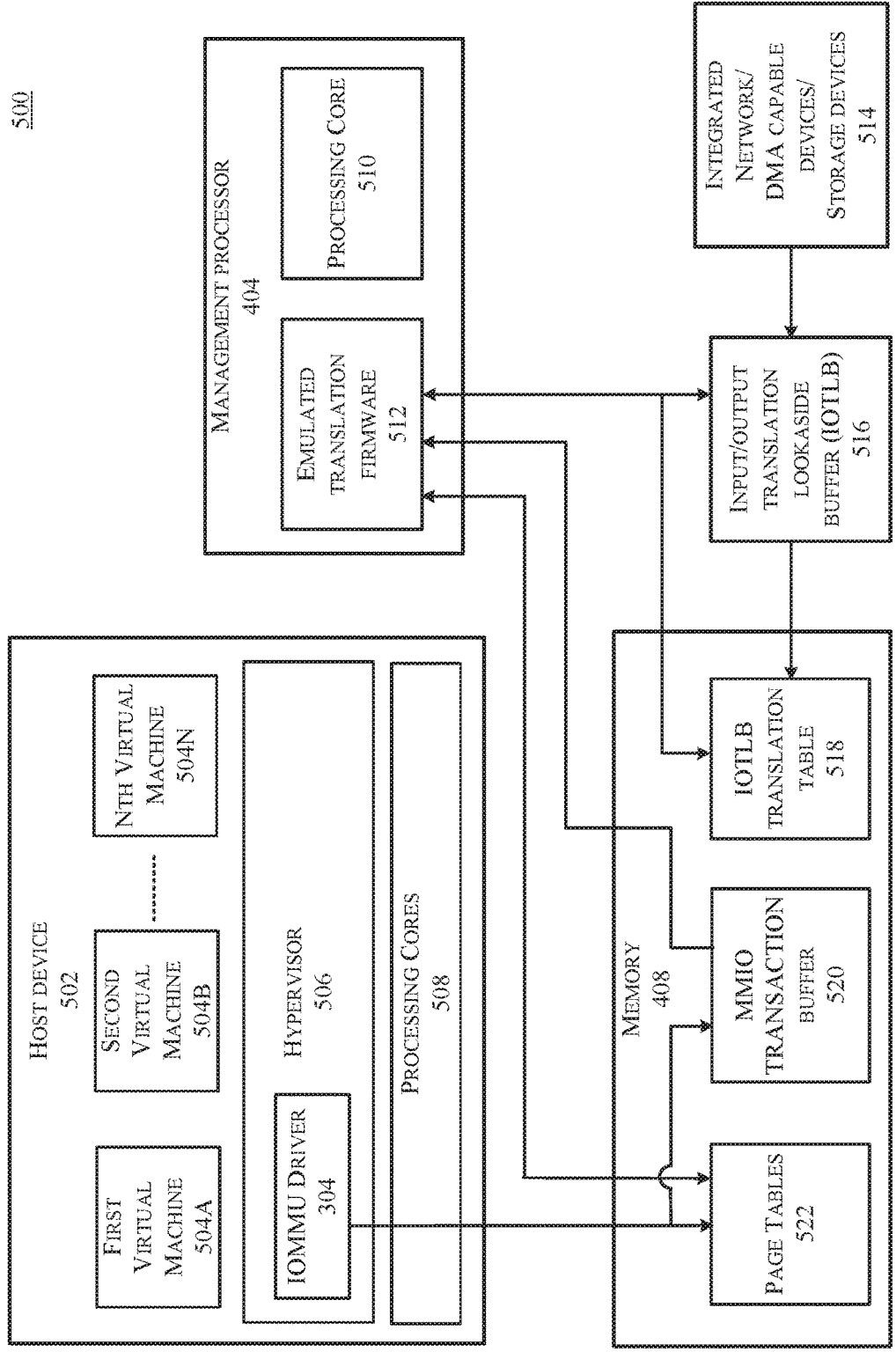
FIG. 5 illustrates a system comprising a management processor for emulating the page table translation for an IOMMU, in one embodiment of the disclosed technology.
Figure 6:
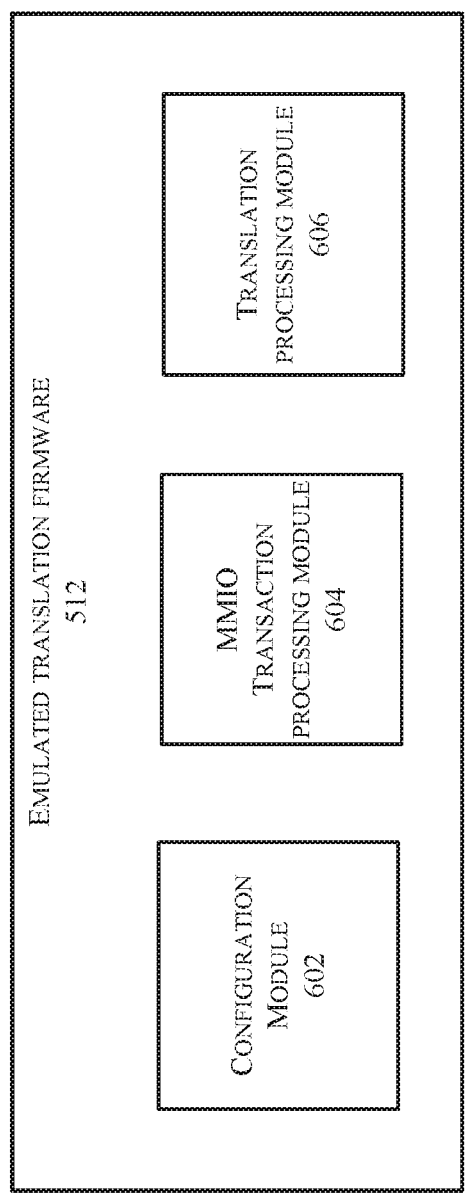
FIG. 6 illustrates components of an emulated translation firmware stored in a memory, according to some embodiments of the disclosed technologies.

FIG. 5 illustrates a system comprising a management processor for emulating the page table translation for an IOMMU, in one embodiment of the disclosed technology. According to some embodiments, the management processor can provide the page table translator functionality in software. The management processor can execute page table walks and can perform translations using the page tables in the memory. Various embodiments of the disclosed technologies can allow the emulated IOMMU to work with the legacy IOMMU driver without needing to update the IOMMU hardware for different architectures.

As illustrated in the figure, a system 500 may include the management processor 404, the memory 408, a host device 502 and an IOTLB 516. Devices 514 may include DMA capable devices (e.g., network devices, storage devices, etc.) that may be accessible using a PCIe (Peripheral Component Interconnect Express) interface or integrated network devices. In some embodiments, the devices 514 may include the devices 104, as discussed with reference to FIGS. 1-3. In some instances, the system 500 may be implemented as a SoC. For example, the system 500 may be part of a host computer. In some implementations, the host computer may provide different services such as compute services, network services, etc. to various clients For example, the compute services may include providing virtual or physical resources to the client computers, e.g., by launching virtual machine instances of various sizes, associating storage volumes to the virtual machines on demand, providing client computers with resources to run applications by renting virtual machines, data processing, storage, etc. The network services may include network related functionalities such as network traffic shaping, network acceleration, network storage processing, network switching, etc. In some embodiments, the management processor 404 can also provide translation for transactions initiated by devices that execute their own memory space and need to be translated to system memory space, e.g., graphics processing units (GPUs) or other execution units.

A plurality of virtual machines 504A-504N, e.g., a first virtual machine 504A, a second virtual machine 504B and a Nth virtual machine 504N, may be configured to run on the host device 502. For example, each of the virtual machines may execute a respective guest operating system (not shown) on the host device 502. Each of the virtual machine 504A-504N can be configured to program the devices 514 with the DMA address from their context view, e.g., using their respective guest operating system physical address or virtual address. For example, in some embodiments, SRIOV (single root input output virtualization) functionality can be utilized to have direct access to the devices 514 using virtual functions.

The processing cores 508 may include a plurality of processing cores that may be configured to execute a plurality of instructions that may be stored in a computer readable storage medium. The computer-readable storage medium may be non-transitory. In some instances, the computer readable medium may be part of a host memory (not shown), e.g., RAM, ROM, EEPROM, flash memory or any suitable storage media. In some instances, the host device 502 may include an x86 CPU platform, e.g., Xeon, Pentium, etc., an ARM platform, or a PowerPC platform, etc. for running an operating system (not shown). The hypervisor 506 may be configured to manage one or more virtual machines on the host device 502, e.g., to create, start, monitor, stop or to delete the virtual machines 504A-504N. The hypervisor 506 may also be configured to execute the IOMMU driver 304. The hypervisor 506 can also manage the flow of information between software, the virtualized hardware, and the physical hardware. In some embodiments, the IOMMU driver 304 may execute on a processing core that may be part of a remote server.

The management processor 404 may include a processing core 510 configured to execute a plurality of computer-executable instructions. In some embodiments, the plurality of computer-executable instructions, when executed by the processing core 510, can cause the processing core 510 to execute an emulated translation firmware 512. For example, the emulated translation firmware 512 may be stored in a RAM, ROM, EEPROM, flash memory or any suitable non-transitory computer readable storage medium. The management processor 404 may be an independent entity or may be part of the host device 502. For example, in some embodiments, the processing core 510 may be one of the processing cores 508. The emulated translation firmware 512 may be configured to perform address translations for memory accesses by the devices 514. For example, the address translations may include translations from an address in the virtual space (e.g., a device virtual address, a guest operating system virtual physical address) to an address from the physical space (e.g., a physical memory address). Accordingly, a single stage translation or a two stage translation may be performed by the management processor 404. In some embodiments, the translations generated by the management processor 404 may be in a format suitable for storing in the IOTLB 516 or the IOTLB translation table 518. In some embodiments, the management processor 404 may be configured to generate the translation for a request upon determining that the translation does not reside in the IOTLB 516. The determination that a translation does not reside in the IOTLB 516 (e.g., an IOTLB miss) may be made by the management processor 404 or the IOTLB 516. The management processor 404 may also be configured to pre-load the IOTLB 516 or the IOTLB translation table 518 with translations between the virtual addresses and the physical memory addresses.

The IOTLB 516 may be similar to the translation cache 406 as discussed with reference to FIG. 4. The IOTLB 516 may be configured to cache commonly used translations generated by the management processor 404. The IOTLB 516 may be implemented in hardware using any suitable generic structure. In some embodiments, the IOTLB 516 may provide an application programming interface (API), e.g., for initialization, translation pre-loading, invalidation of certain entries, etc. For example, the management processor 404 may be configured to translate the specific IOMMU driver 304 to the implementation specific hardware IOTLB 516 API. The IOTLB 516 may get a translation request for a transaction initiated by any of the devices 514 with a DMA address programmed directly by any of the virtual machines 504A-504N. For example, in some embodiments, direct access to the devices 514 may be provided by utilizing SRIOV functionality by the virtual machines 504A-504N. The IOTLB 516 can identify the virtual machine requesting the memory access based on a virtual machine identifier associated with the transaction and can provide the corresponding physical memory address for that virtual machine. For example, different translation entries in the IOTLB 516 may correspond to different virtual machines. In some implementations, the translation result may also include attributes associated with the particular translation, e.g., one or more bits of the virtual address provided with the request or any other relevant information related to the translation.

The memory 408 may include page tables 522, a memory mapped input output (MMIO) transaction buffer 520 and an IOTLB translation table 518. The memory 408 may be a volatile memory. For example, the memory 408 may include a random access memory such as a DRAM, synchronous DRAM, double data rate (DDR) SDRAM or any suitable memory. In some implementations, the memory 408 may be part of a system memory.

The page tables 522 may include a plurality of page tables to store the mapping between the virtual addresses and the physical addresses. The page tables 522 may be implemented using any suitable data structure. In different embodiments, configuration and implementation of the page tables 522 may vary based on the CPU architecture supported by the system 500, e.g., x86, ARM, 32 bit or 64 bit systems, etc. In some embodiments, the IOMMU driver 304 may configure the page tables 522 for the virtual machines 504A-504N based on the architecture and implementation of the SoC. For example, page sizes (4K, 16K, 2M, etc.) and page hierarchies (e.g., various pointers, indices, offsets, etc.) for different page tables may vary based on different architectures.

The MMIO transaction buffer 520 may be configured to log writes and reads requests received from the IOMMU driver 304 for different virtual machines. For example, the MMIO transaction buffer 520 may be memory mapped to a specific address range in the memory 408 (e.g., in the PCIe memory mapped space) associated with the IOMMU hardware. The IOMMU driver 304 can target the IOMMU hardware using memory mapped IO register access (e.g., 32 bit or 64 bit access) to the specific address range. The accesses to the specific address range may be identified by the hardware and logged into the MMIO transaction buffer 520. The MMIO transaction buffer 520 may be implemented using a FIFO (first-in-first-out), a circular buffer, or any suitable implementation. The MMIO transaction buffer 520 may also be configured to generate an interrupt or trap for the management processor 404 for processing each MMIO transaction. The management processor 404 can fetch the MMIO transaction from the MMIO transaction buffer 520 after receiving the interrupt. The management processor 404 can generate the translation for the request for storing in the IOTLB 516 upon determination that the translation does not exist in the IOTLB 516 or the IOTLB translation table 518.

The IOTLB translation table 518 may include a table in the memory 408 with the translations generated by the management processor 404. In some implementations, the IOTLB translation table 518 may be implemented as a second level of cache or an extension of the IOTLB 516 in the memory 408. For example, in some implementations, when a translation is not found in the IOTLB 516 (e.g., a TLB miss), the IOTLB translation table 518 is searched for a match before performing a page table walk of the page tables 522 for generating the translation. The IOTLB translation table 518 may provide a larger storage area for translations as compared to the IOTLB 516 and can help avoid a page table walk of the page tables 522. In some instances, the translation may not be found in the IOTLB 516 or the IOTLB translation table 518 due to a translation fault. For example, the translation faults may be caused by invalid entries, missing translations, invalid virtual addresses provided for translation, etc. The management processor 404 may also be configured to process all the translation faults and error conditions and can report to the IOMMU driver 304.

The emulated translation firmware 512 may include a configuration module 602, an MMIO transaction processing module 604 and a translation processing module 606, in one embodiment of the disclosed technology. In various different embodiments, the emulated translation firmware 512 may be configured to provide translation from a virtual space to a physical space in software. The emulated translation firmware 512 may be implemented in the form of a memory, e.g., a flash memory, RAM, ROM, etc.

The configuration module 602 can be used to configure the IOTLB 516 for storing the translations from the virtual space to the physical space. For example, the translations can be stored in the IOTLB 516 in a particular format. In some embodiments, the configuration module 602 may pre-load the IOTLB 516 with a set of translations using the API provided by the IOTLB 516. For example, the set of translations may include translations to initialize the IOTLB 516, to invalidate certain entries or to pre-load certain translations. In one embodiment, the configuration module 602 may pre-load the IOTLB 516 with commonly used translations.

The MMIO transaction processing module 604 can be used to process MMIO transactions received from the MMIO transaction buffer 520. In one embodiment, the MMIO transaction processing module 604 may fetch MMIO transaction data for a translation request stored in the MMIO transaction buffer 520. For example, the MMIO transaction processing module 604 may receive a trap or an interrupt generated by the MMIO transaction buffer 520 for processing the translation request. In some embodiments, the translation request may be stored in the MMIO transaction buffer 520 by the IOMMU driver 304 when a DMA operation is initiated by one of the virtual machines 504A-504N. In some embodiments, the MMIO transaction processing module 604 may process a transaction initiated by the IOMMU driver 304 to initialize the IOTLB 516 for a particular translation context.

The translation processing module 606 may be configured to generate the translation between the virtual space and the physical space. For example, the translation processing module 606 may generate the translation for translation request processed by the MMIO transaction processing module 604. In some embodiments, the translation processing module 606 may generate the translation for a translation request upon determining that the translation does not exist in the IOTLB 516 or the IOTLB translation table 518. The translation processing module 606 may generate the translation based on the specific architecture supported by the IOMMU driver 304 and can store the translation in the IOTLB 516.

Some embodiments of the disclosed technologies can implement the translation functionality of the IOMMU in software, thus providing the flexibility of generating page tables that are compatible with the CPU MMU architecture with minimum changes to the IOMMU hardware. Some embodiments of the disclosed technologies can emulate an interrupt translation service in software for an interrupt controller as discussed with reference to FIG. 7 and FIG. 8. For example, the interrupt controller may include interrupt translation tables in hardware and may perform page table walk for interrupt context.

Figure 7:
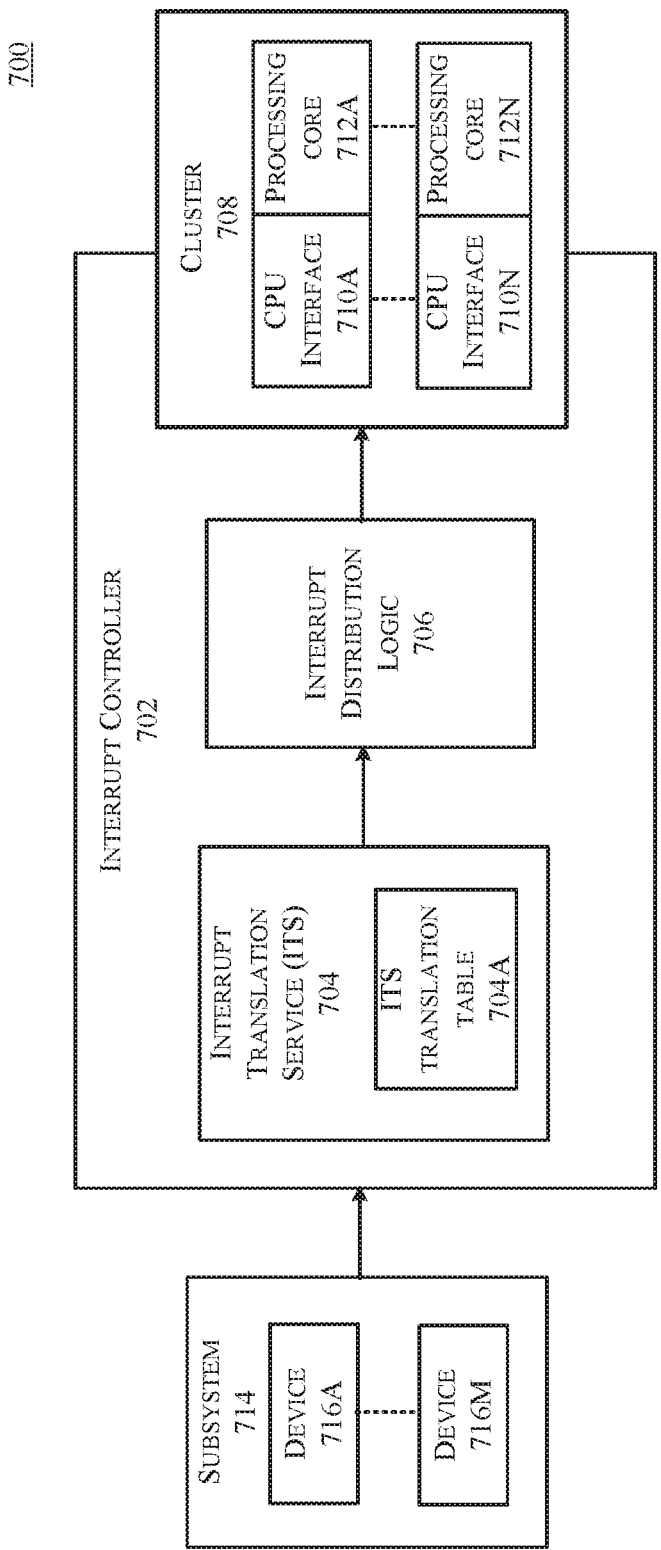
FIG. 7 illustrates a typical interrupt controller configured to support virtualization and interrupt remapping.

FIG. 7 illustrates a typical interrupt controller configured to support virtualization and interrupt remapping.

An interrupt controller 702 may include an interrupt translation service 704 and an interrupt distribution logic 706. The interrupt controller 702 may be able to support virtualization and interrupt remapping as is known in the art. The interrupt distribution logic 706 may be configured to communicate with a cluster 708 comprising a plurality of CPU interfaces 710A-710N and processing cores 712A-712N. The cluster 708 may be part of the processing cores 508 as discussed with reference to FIG. 5. The interrupt controller 702 may be configured to receive virtualized interrupts from a subsystem 714 comprising a plurality of devices 716A-716M. The plurality of devices 716A-716M may include peripheral devices, e.g., PCIe based devices.

The interrupt translation service 704 may be configured to provide a translation for an interrupt identifier from the virtual space to an address corresponding to the physical space. For example, the interrupt identifier may be used by a virtual machine for a message based interrupt from a device communicatively coupled to the management processor. The message based interrupt may be generated by writing to a memory mapped register by the device (e.g., similar to the MMIO transaction buffer 518 as discussed with reference to FIG. 5). The address corresponding to the physical space may be used by the interrupt distribution logic 706 to access the memory (not shown). The interrupt translation service 704 may store commonly used interrupts in an interrupt translation cache (not shown). The interrupt translation service 704 may include translation tables 704A in hardware to store the translations. If a translation is not found in the interrupt translation cache, page table walk may be performed to find the translation in the translation tables 704A. The address translated by the interrupt translation service 704 may be in the form of an interrupt line that can be provided to the interrupt distribution logic 706.

The interrupt distribution logic 706 may be configured to perform interrupt prioritization and distribution to the CPU interfaces 710A-710N corresponding to the respective processors 712A-712N. For example, the interrupt distribution logic 706 may distribute the interrupt line to a physical CPU or may provide to a virtual machine for further processing.

Some embodiments of the disclosed technologies can be used to emulate the interrupt translation service 704 as discussed with reference to FIG. 8.

Figure 8:
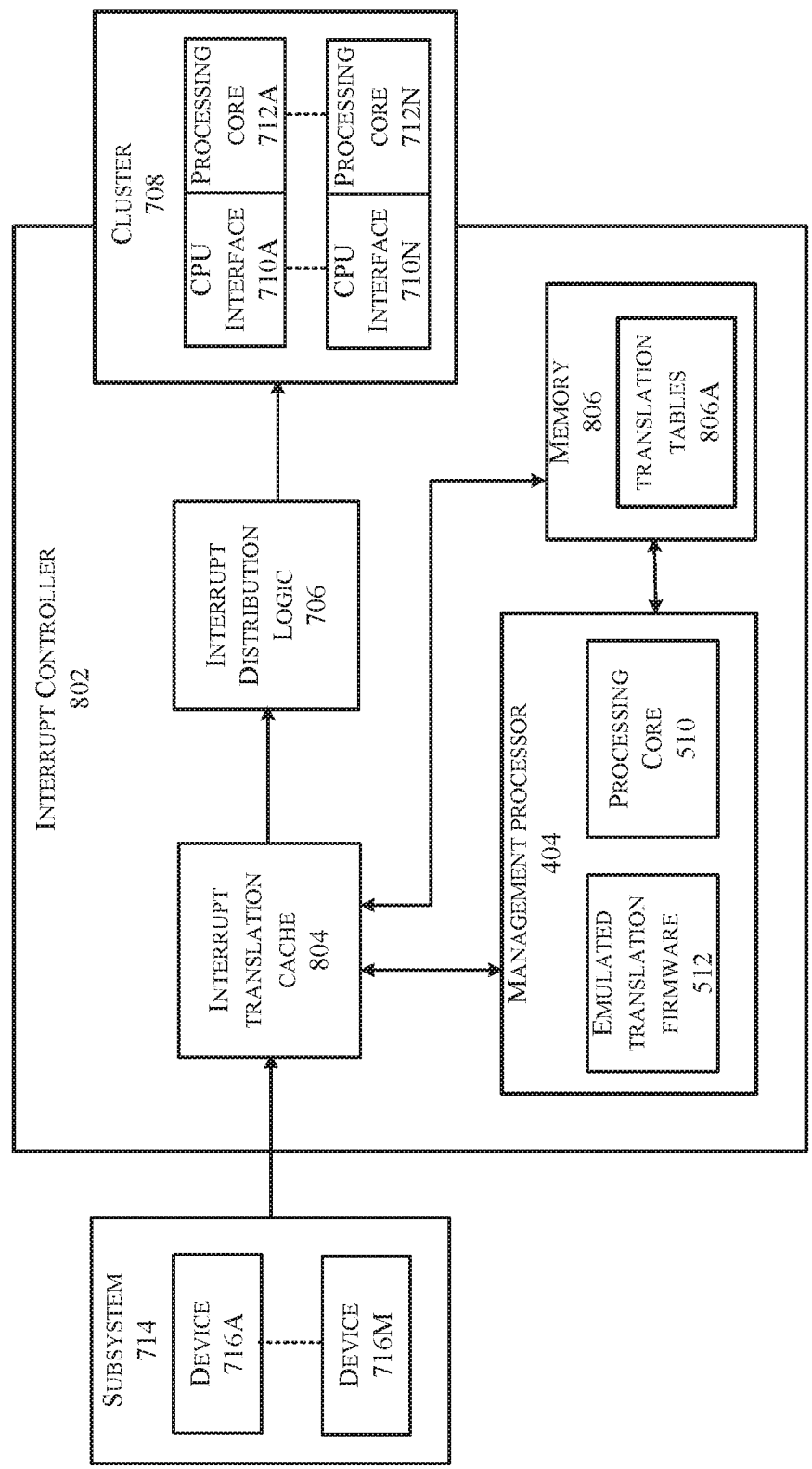
FIG. 8 illustrates an interrupt controller including a management processor for emulating interrupt translation service functionality in software, in one embodiment of the disclosed technology.
Figure 9:
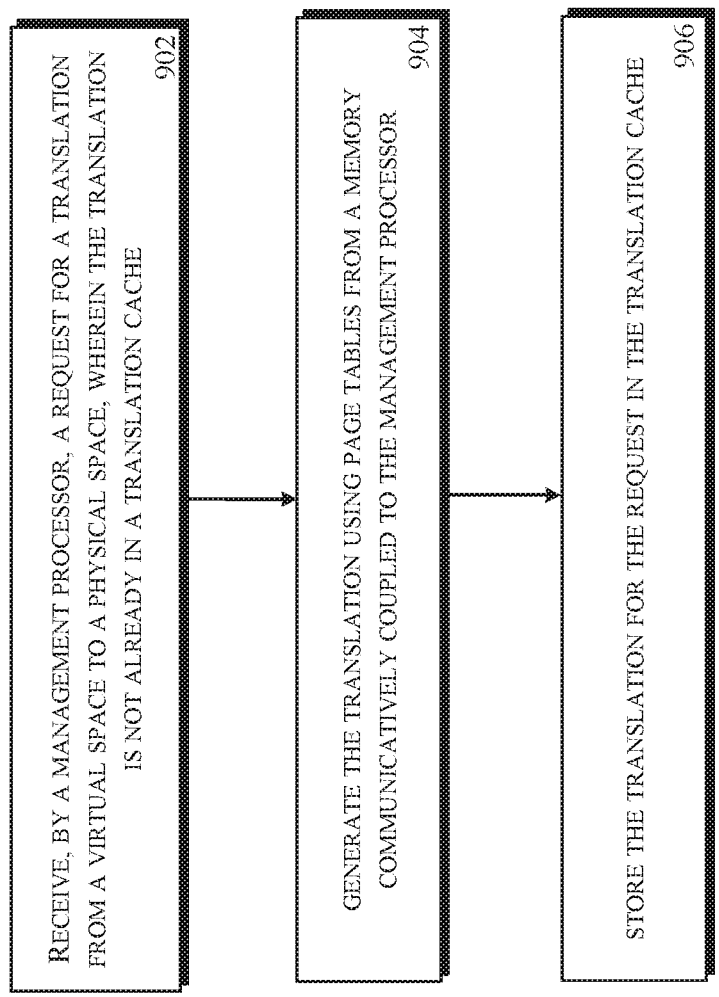
FIG. 9 illustrates a method for performing translation from a virtual space to a physical space using emulated translation firmware, in one embodiment of the disclosed technology.

FIG. 8 illustrates an interrupt controller 802 including the management processor 404 for emulating the interrupt translation service functionality in software, in one embodiment of the disclosed technology. The management processor 404 may be communicatively coupled to an interrupt translation cache 804 and a memory 806. In one embodiment, the interrupt translation cache 804 may be implemented in hardware using any suitable implementation. The memory 806 may include translation tables 806A implemented in software using any suitable implementation, e.g., hierarchies, pointers, indices, tables, etc. In some embodiments, the processing core 510 can be part of the cluster 708.

As discussed with reference to FIG. 4, some embodiments of the disclosed technologies may be used to translate interrupts from the virtual space to the physical space. In some embodiments, the management processor 404 can be configured to emulate the interrupt translation service 704. For example, the emulated translation firmware 512 in the management processor 404 can include instructions to generate translation for an interrupt identifier from the virtual space to an address corresponding to the physical space. The interrupt translation cache 804 can be configured to store commonly used interrupts. The management processor 404 can perform interrupt translation using the translation tables 806A if an interrupt translation is not found in the interrupt translation cache 804. The management processor 404 can store the interrupt translation in the interrupt translation cache 804 which can be used by the interrupt distribution logic 706. The management processor 404 may also be configured to perform other services using the emulated translation firmware 512, e.g., interrupt remapping, invalidation and exception handling, for the interrupts. For example, the interrupt remapping can provide isolation and compatibility by directing the interrupts to a target processing core. In some embodiments, the management processor 404 may be configured to invalidate some or all the entries of the interrupt translation cache 804 for a context switch, e.g., for different virtual machines or processes. The management processor 404 may also be configured to handle the exceptions when there is a translation fault and may report the exception to the hypervisor.

As discussed with reference to FIG. 8, some embodiments of the disclosed technologies may be used to implement the interrupt translation service in software, thus minimizing hardware revisions for different SoC versions.

In step 902, a management processor receives a request for a translation from a virtual space to a physical space, wherein the translation is not already in a translation cache. Referring back to FIG. 4, the management processor 404 can receive a request for a translation from the virtual space to the physical space if the translation for the request is not already in the translation cache 406. For example, in one embodiment, the request for the translation may be for translating a virtual address to a physical memory address for a memory access by a device. As discussed with reference to FIG. 5, the IOTLB 516 may get a translation request for a transaction initiated by any of the devices 414 with a DMA address programmed directly by any of the virtual machines 504A-504N. The IOTLB 516 can identify the virtual machine requesting the memory access based on a virtual machine identifier associated with the transaction and can provide the corresponding physical memory address if a match is found in the IOTLB 516. If a match is not found in the IOTLB 516, the IOMMU driver 304 can target the IOMMU hardware for the translation by performing a memory mapped IO transaction to the specific address range in the memory 408. The transaction can be logged in the MMIO transaction buffer 520 for processing by the management processor 404. In one embodiment, if the match is not found in the IOTLB 516, the IOTLB translation table 518 may be searched for the translation before sending the translation request to the management processor 404. The management processor 404 may get trapped by the MMIO transaction buffer 520 to process the request for the translation from the virtual address to the physical memory address. In another embodiment, the request for the translation may be for translating an interrupt identifier from the virtual space to a physical memory address for a message based interrupt from a device, as discussed with reference to FIG. 8.

In step 904, the management processor generates the translation using the page tables from a memory communicatively coupled to the management processor. For example, in one embodiment, the management processor 404 may generate the translation using the page tables 522 from the memory 408, as discussed with reference to FIG. 5. The page tables 522 may be configured by the IOMMU driver 304 based on the architecture and implementation of the SoC. In one embodiment, the management processor 404 may perform a page table walk of the page tables 522 and generate the translation in a format suitable for storing in the IOTLB 516. In one embodiment, the management processor 404 may generate the translation for the interrupt using the translation tables 806A for storing in the interrupt translation cache 804, as discussed with reference to FIG. 8.

In step 906, the management processor stores the translation for the request in the translation cache. For example, in one embodiment, the management processor 404 may store the translation for the request in the IOTLB 516, as discussed with reference to FIG. 5. The management processor 404 may store in the IOTLB 516 a physical memory address corresponding to the virtual address provided for the translation. A subsequent DMA request using the same virtual address may get a hit in the IOTLB 516 and can use the physical memory address provided by the IOTLB 516 to access the memory. In one embodiment, the management processor 404 may store the translation for the request in the interrupt translation cache 804, as discussed with reference to FIG. 8.

Various embodiments of the disclosed technologies can emulate page table translation in software thus minimizing changes to the SoC hardware for different implementations and architectures supported by the SoC. Some embodiments of the disclosed technologies can implement the translation functionality of the IOMMU in software, thus providing the flexibility of generating page tables that are compatible with the CPU MMU architecture with minimum changes to the IOMMU hardware. The emulated IOMMU can also provide two stage translations to support virtualization which can help manage virtual devices as well as provide isolation among the virtual machines. Some embodiments of the disclosed technologies can emulate an interrupt translation service in software for an interrupt controller. Embodiments of the disclosed technologies can be applied to any hardware entity that implements one sided architecture specific features. For example, an entity that uses memory based accesses on one side and a commonly used hardware entity on the other side, e.g., a cache or a translation buffer, can utilize the embodiments to provide a split architecture with software based implementation on one side and hardware based implementation on the other side.

Figure 10:
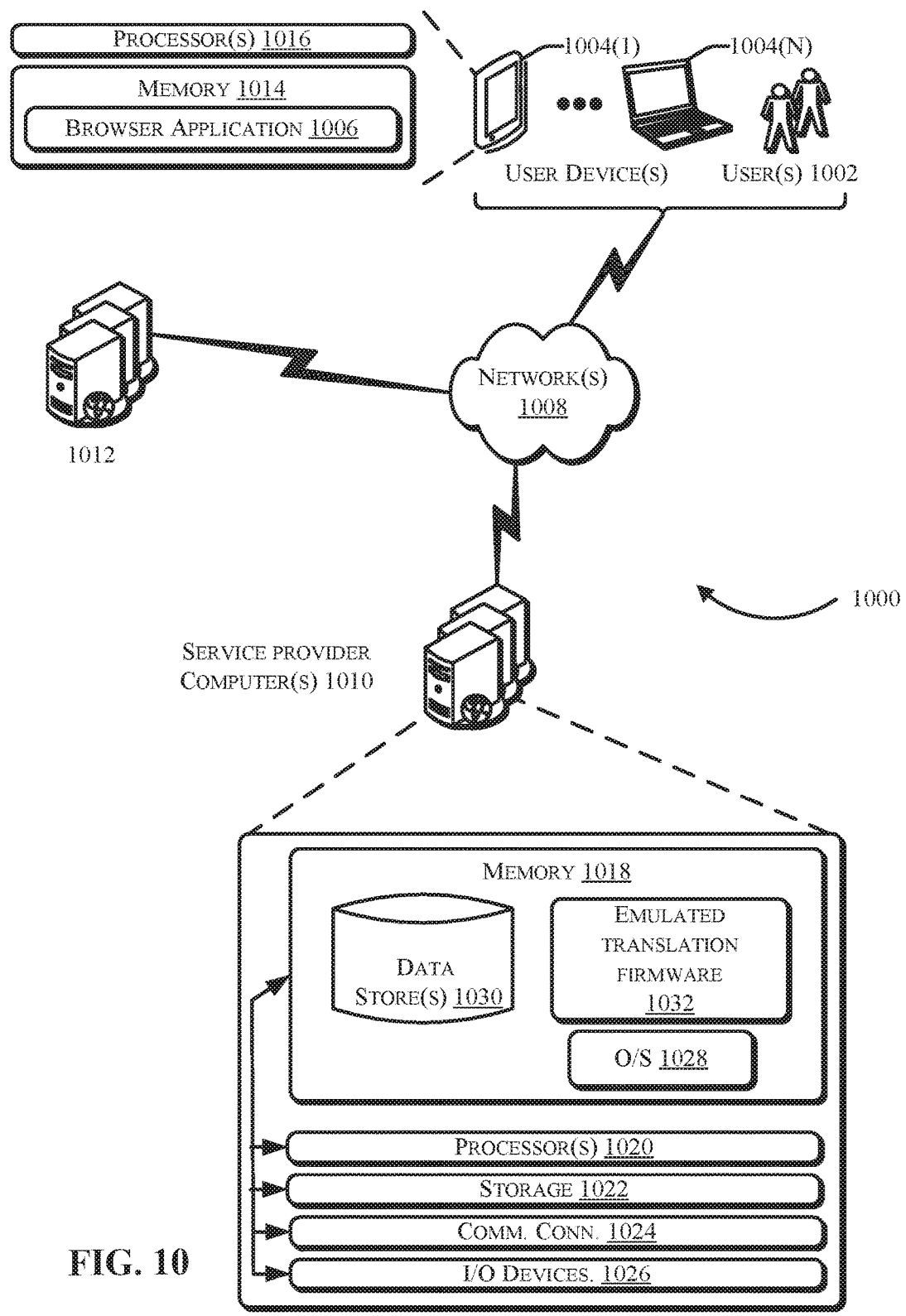
FIG. 10 illustrates an exemplary architecture for features and systems described herein that includes one or more service provider computers and/or a user device connected via one or more networks, according to at least one exemplary embodiment.

FIG. 10 illustrates an exemplary architecture for features and systems described herein that includes one or more service provider computers and/or a user device connected via one or more networks, according to at least one exemplary embodiment. The devices discussed in FIGS. 4-5, may use one or more components of the computing devices described in FIG. 10 or may represent one or more computing devices described in FIG. 10. In architecture 1000, one or more users 1002 may utilize user computing devices 1004(1)-(N) (collectively, user devices 1004) to access application 1006 (e.g., a web browser or mobile device application), via one or more networks 1008. In some aspects, application 1006 may be hosted, managed and/or provided by a computing resources service or service provider. One or more service provider computers 1010 may provide a native application which is configured to run on user devices 1004 which user(s) 1002 may interact with. Service provider computer(s) 1010 may, in some examples, provide computing resources such as, but not limited to, client entities, low latency data storage, durable data storage, data access, management, virtualization, cloud-based software solutions, electronic content performance management, etc. Service provider computer(s) 1010 may also be operable to provide web hosting, computer application development and/or implementation platforms, combinations of the foregoing or the like to user(s) 1002. Service provider computer(s) 1010, in some examples, may communicate with one or more third party computers 1012.

In some examples, network(s) 1008 may include any one or a combination of many different types of networks, such as cable networks, the Internet, wireless networks, cellular networks and other private and/or public networks. While the illustrated example represents user(s) 1002 accessing application 1006 over network(s) 1008, the described techniques may equally apply in instances where user(s) 1002 interact with service provider computer(s) 1010 via user device(s) 1004 over a landline phone, via a kiosk or in any other manner. It is also noted that the described techniques may apply in other client/server arrangements (e.g., set-top boxes, etc.), as well as in non-client/server arrangements (e.g., locally stored applications, etc.).

As described briefly above, application 1006 may allow user(s) 1002 to interact with service provider computer(s) 1010 such as to access web content (e.g., web pages, music, video, etc.). Service provider computer(s) 1010, perhaps arranged in a cluster of servers or as a server farm, may host application 1006 and/or cloud-based software services. Other server architectures may also be used to host application 1006. Application 1006 may be capable of handling requests from many users 1002 and serving, in response, various item web pages. Application 1006 can provide any type of website that supports user interaction, including social networking sites, online retailers, informational sites, blog sites, search engine sites, news and entertainment sites and so forth. As discussed above, the described techniques can similarly be implemented outside of application 1006, such as with other applications running on user device (s) 1404.

User device(s) 1004 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, user device(s) 1004 may be in communication with service provider computer(s) 1010 via network(s) 1008, or via other network connections. Additionally, user device(s) 1004 may be part of the distributed system managed by, controlled by or otherwise part of service provider computer(s) 1010 (e.g., a console device integrated with service provider computers 1010).

In one illustrative configuration, user device(s) 1004 may include at least one memory 1014 and one or more processing units (or processor(s)) 1016. Processor(s) 1016 may be implemented as appropriate in hardware, computer-executable instructions, firmware, or combinations thereof. Computer-executable instruction or firmware implementations of processor(s) 1016 may include computer-executable or machine-executable instructions written in any suitable programming language to perform the various functions described. User device(s) 1004 may also include geo-location devices (e.g., a global positioning system (GPS) device or the like) for providing and/or recording geographic location information associated with user device(s) 1004.

Memory 1014 may store program instructions that are loadable and executable on processor(s) 1016, as well as data generated during the execution of these programs. Depending on the configuration and type of user device(s) 1004, memory 1014 may be volatile (such as random access memory (RAM)) and/or non-volatile (such as read-only memory (ROM), flash memory, etc.). User device(s) 1004 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, memory 1014 may include multiple different types of memory, such as static random access memory (SRAM), dynamic random access memory (DRAM), or ROM.

Turning to the contents of memory 1014 in more detail, memory 1014 may include an operating system and one or more application programs or services for implementing the features disclosed herein including at least a user provided input element or electronic service web page, such as via browser application 1006 or dedicated applications (e.g., smart phone applications, tablet applications, etc.). Browser application 1006 may be configured to receive, store and/or display a website or other interface for interacting with service provider computer(s) 1010. Additionally, memory 1014 may store access credentials and/or other user information such as, but not limited to, user IDs, passwords and/or other user information. In some examples, the user information may include information for authenticating an account access request such as, but not limited to, a device ID, a cookie, an IP address, a location or the like. In addition, the user information may include a user-provided response to a security question or a geographic location obtained by the user device 1004.

In some aspects, service provider computer(s) 1010 may also be any type of computing devices such as, but not limited to, a mobile phone, a smart phone, a personal digital assistant (PDA), a laptop computer, a desktop computer, a server computer, a network switch, a thin-client device, a tablet PC, etc. Additionally, it should be noted that in some embodiments, service provider computer(s) 1010 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, service provider computer(s) 1010 may be in communication with user device(s) 1004 and/or other service providers via network(s) 1008, or via other network connections. Service provider computer(s) 1010 may include one or more servers, perhaps arranged in a cluster, as a server farm, or as individual servers not associated with one another. These servers may be configured to implement the keyword classification and rating feature services described herein as part of an integrated, distributed computing environment.

In one illustrative configuration, service provider computer(s) 1010 may include at least one memory 1018 and one or more processing units (or processor(s)) 1020. Processor(s) 1020 may be implemented as appropriate in hardware, computer-executable instructions, firmware or combinations thereof. Computer-executable instruction or firmware implementations of processor(s) 1020 may include computer-executable or machine-executable instructions written in any suitable programming language to perform the various functions described.

In some instances, hardware processor(s) 1020 may be a single core processor or a multi-core processor. A multi-core processor may include multiple processing units within the same processor. In some embodiments, the multi-core processors may share certain resources, such as busses and second or third level of cache between multiple-cores. In some instances, each core in a single or multi-core processor may also include multiple executing logical processors (or threads). In such a core (that supports multiple logical processors), several stages of the execution pipeline and also lower level caches may also be shared.

Memory 1018 may store program instructions that are loadable and executable on processor(s) 1020, as well as data generated during the execution of these programs. Depending on the configuration and type of service provider computer(s) 1010, memory 1018 may be volatile (such as RAM) and/or non-volatile (such as ROM, flash memory, etc.). Service provider computer(s) 1010 or servers may also include additional storage 1022, which may include removable storage and/or non-removable storage. The additional storage 1022 may include, but is not limited to, magnetic storage, optical disks and/or tape storage. The disk drives and their associated computer-readable media may provide non-volatile storage of computer-readable instructions, data structures, program modules and other data for the computing devices. In some implementations, memory 1018 may include multiple different types of memory, such as SRAM, DRAM, or ROM.

Memory 1018, the additional storage 1022, both removable and non-removable are all examples of computer-readable storage media. For example, computer-readable storage media may include volatile or non-volatile, removable or non-removable media implemented in any method or technology for storage of information such as computer-readable instructions, data structures, program modules or other data. Memory 1018 and the additional storage 1022 are all examples of computer storage media. Additional types of computer storage media that may be present in service provider computer(s) 1010 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by service provider computer(s) 1010. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

Service provider computer(s) 1010 may also contain communications connection(s) 1024 that allow service provider computer(s) 1010 to communicate with a stored database, another computing device or server, user terminals and/or other devices on network(s) 1008. Service provider computer(s) 1010 may also include I/O device(s) 1026, e.g., a keyboard, a mouse, a pen, a voice input device, a touch input device, a display, speakers, a printer, etc.

Memory 1018 may include an operating system 1028, one or more data stores 1030 and/or one or more application programs or services for implementing the features disclosed herein. In some implementations, the memory 1018 may include emulated translation firmware 1032. The emulated translation firmware 1032 may be similar to the emulated translation firmware 512 as described with reference to FIG. 5. For example, the emulated translation firmware 1032 may include instructions to translate an address from a virtual space to an address from a physical space. The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 10, and/or functions described herein can be provided by one or more modules that exist as separate modules and/or module functions described herein can be spread over multiple modules.

Figure 11:
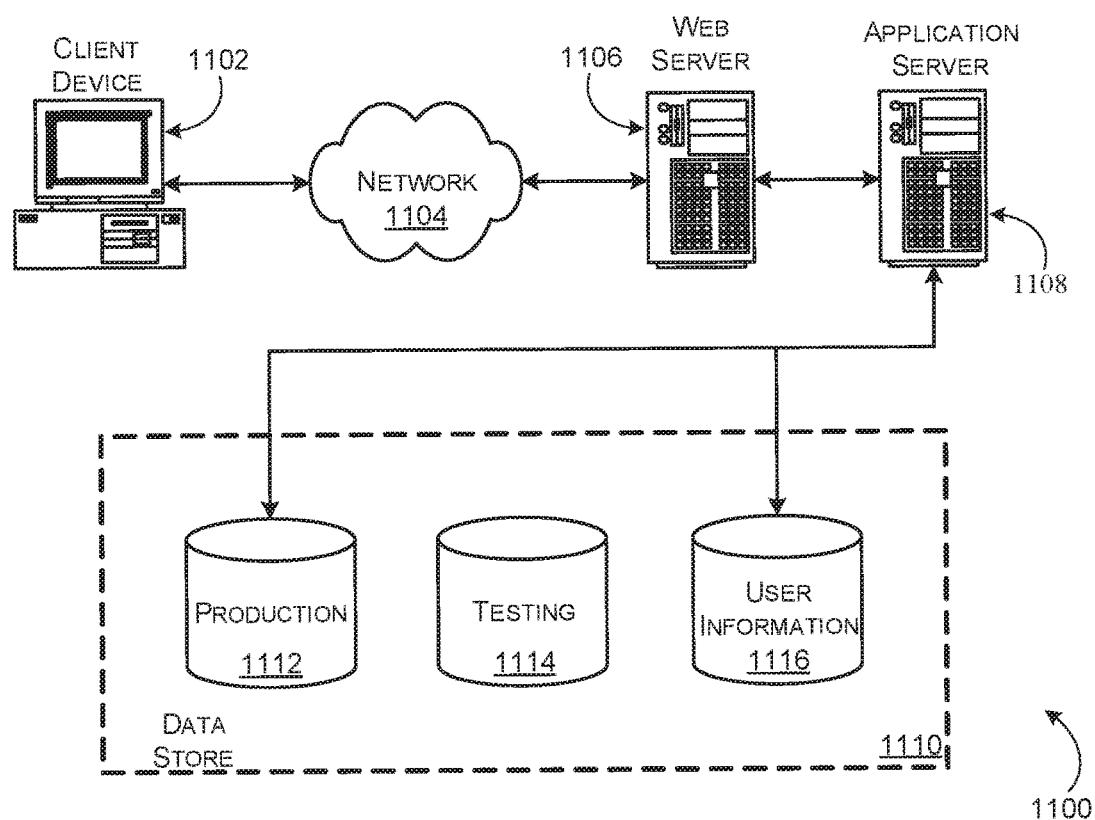
FIG. 11 illustrates an environment in which various embodiments can be implemented.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1100. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those various embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system comprising:
    a first processor configured to execute a first context and a second context;
    a memory communicatively coupled to the first processor, wherein the memory is configured to store page tables that are used for generating translations between addresses for the first context and physical addresses for the memory, and generating translations between addresses for the second context and the physical addresses for the memory;
    a translation cache configured for storing translations between the addresses from the first context and the physical addresses for the memory; and
    a second processor communicatively coupled to the memory and to the translation cache, the second processor configured to execute instructions stored in a non-transitory computer readable medium that cause the second processor to:
        perform context switching on the translation cache from the first context to the second context, wherein performing the context switching includes pre-loading the translation cache with a set of translations for the second context;
        receive a request from the first processor for a translation from an address for the second context to a physical address for the memory, wherein the translation is not already in the translation cache;
        generate the translation using the page tables stored in the memory; and
        store the translation for the request in the translation cache.

2. The system of claim 1, wherein the translation cache is a hardware translation cache configured to store the translations between the addresses of the first context and the physical addresses of the memory, prior to the context switching.

3. The system of claim 1, wherein the translation cache includes a translation table in the memory for storing the translations between addresses of the first context and the physical addresses of the memory, prior to the context switching.

4. The system of claim 1, wherein the addresses from the first context are addresses for a virtual address space for the first context.

5. The system of claim 1, wherein the request for the translation is received from an input/output memory management unit (IOMMU) driver executing on the first processor.

6. The system of claim 5, wherein the IOMMU driver communicates with the second processor using memory mapped input/output (MMIO) operations using a MMIO transaction buffer in the memory.

7. The system of claim 5, wherein the page tables in the memory are configured by the IOMMU driver for generating the translations between the addresses of the first context or the second context or both, and wherein the physical addresses for the memory are based on a specific translation architecture.

8. The system of claim 5, wherein the translation is associated with a direct memory access (DMA) to the memory by a device communicatively coupled to the translation cache.

9. The system of claim 1 wherein the instructions stored in the non-transitory computer readable medium further cause the second processor to perform invalidation and exception handling associated with the translation cache.

10. The system of claim 1, wherein the translations include a translation of an interrupt identifier for the first context to a physical address of the memory.

11. The system of claim 10, wherein the interrupt identifier is associated with a message based interrupt generated from a device communicatively coupled to the translation cache.

12. The system of claim 11, wherein the instructions stored in the non-transitory computer readable medium further cause the second processor to perform interrupt remapping of the message based interrupt.

13. The system of claim 1, wherein the system is implemented as a system-on-chip (SoC), field programmable gate array (FPGA), microprocessor, or an application specific integrated circuit (ASIC).

14. A method comprising:

receiving, by a first processor in a system, a request from a second processor for a translation for an address from a first context to a physical address for a memory upon a determination that the translation for the request does not reside in a hardware translation cache communicatively coupled to the first processor, wherein the hardware translation cache is configured to store translations for addresses for the first context and physical addresses for the memory, wherein the second processor is configured to execute the first context and a second context, and wherein the first processor is configured to manage the hardware translation cache to perform context switching from the first context to the second context, wherein the context switching includes pre-loading the hardware translation cache with a set of translations for the second context;

generating the translation for the request using page tables from the memory, wherein the memory is communicatively coupled to the first processor; and storing the translation for the request in the hardware translation cache.

15. The method of claim 14, wherein the addresses for the first context are addresses for a virtual address space for the first context.

16. The method of claim 14, wherein the request for the translation is received from an input/output memory management unit (IOMMU) driver executing on the second processor.

17. The method of claim 16, wherein the IOMMU driver communicates with the first processor using memory mapped input/output (MMIO) operations using a MMIO transaction buffer in the memory.

18. The method of claim 16, wherein the page tables in the memory are configured by the IOMMU driver for generating translations between the addresses of the first context or the second context or both, and the physical addresses for the memory are based on a specific translation architecture.

19. The method of claim 14, wherein the translations include a translation of an interrupt identifier for the first context to a physical address of the memory.

20. The method of claim 19, wherein the interrupt identifier is associated with a message based interrupt generated from a device communicatively coupled to the hardware translation cache.

* * * * *